(12) United States Patent
Pandit

(10) Patent No.: US 8,103,625 B1
(45) Date of Patent: *Jan. 24, 2012

(54) SYSTEM AND METHOD FOR PROVIDING ACCESS TO REPLICATED DATA

(75) Inventor: Bhushan S. Pandit, Pune (IN)

(73) Assignee: Symantec Operating Corporation, Mountain View, CA (US)

( * ) Notice: Subject to any disclaimer, the term of this patent is extended or adjusted under 35 U.S.C. 154(b) by 389 days.

This patent is subject to a terminal disclaimer.

(21) Appl. No.: 12/110,500

(22) Filed: Apr. 28, 2008

Related U.S. Application Data

(63) Continuation of application No. 10/322,121, filed on Dec. 17, 2002, now Pat. No. 7,370,025.

(51) Int. Cl.
*G06F 17/30* (2006.01)
(52) U.S. Cl. ............... 707/610; 707/609; 707/E17.001
(58) Field of Classification Search .................. None
See application file for complete search history.

(56) References Cited

U.S. PATENT DOCUMENTS

| | | | | |
|---|---|---|---|---|
| 5,452,448 | A | 9/1995 | Sakuraba et al. | 707/201 |
| 5,737,601 | A | 4/1998 | Jain et al. | 707/201 |
| 5,802,301 | A | 9/1998 | Dan et al. | 709/223 |
| 6,581,143 | B2 | 6/2003 | Gagne et al. | 711/162 |
| 6,625,750 | B1 | 9/2003 | Duso et al. | 714/11 |
| 6,643,795 | B1 | 11/2003 | Sicola et al. | 714/6 |
| 6,662,196 | B2 | 12/2003 | Holenstein et al. | 707/202 |
| 7,039,663 | B1 | 5/2006 | Federwisch et al. | 707/205 |
| 7,054,927 | B2 | 5/2006 | Ulrich et al. | 709/223 |
| 7,139,811 | B2 * | 11/2006 | Lev Ran et al. | 709/217 |
| 2001/0039548 | A1 | 11/2001 | Shinkai et al. | 707/201 |
| 2002/0198899 | A1 | 12/2002 | Yamaguchi et al. | 707/200 |
| 2003/0014523 | A1 | 1/2003 | Teloh et al. | 709/226 |
| 2003/0126107 | A1 | 7/2003 | Yamagami | 707/1 |
| 2003/0217119 | A1 * | 11/2003 | Raman et al. | 709/219 |
| 2004/0205152 | A1 | 10/2004 | Yasuda et al. | 709/217 |
| 2004/0267836 | A1 | 12/2004 | Armangau et al. | 707/203 |

FOREIGN PATENT DOCUMENTS

| | | | |
|---|---|---|---|
| EP | 1452982 A2 | 9/2004 | 17/30 |
| WO | WO03094056 | 11/2003 | 17/30 |
| WO | WO2005064469 | 7/2005 | 11/14 |

OTHER PUBLICATIONS

Alonso, R. et al. "Managing Replicated Copies In Very Large Distributed Systems," Workshop On The Management of Replicated Data Proceedings, 1990, pp. 39-42.

Lim, James B. et al., "Transaction Processing in Mobile, Heterogeneous Database Systems," IEEE Transactions On Knowledge and Data Engineering, vol. 14, No. 6, Dec. 2002, pp. 1330-1346.

(Continued)

*Primary Examiner* — Shyue Jiunn Hwa
(74) *Attorney, Agent, or Firm* — Campbell Stephenson LLP

(57) ABSTRACT

A system and method for providing access to replicated data is disclosed. Embodiments of the present invention utilize a remote access file system to provide access to replicated data concurrently with replication. According to one embodiment including unidirectional replication, access to a replicated target volume is provided using a remote access file system to perform reads locally or "directly" and to perform writes indirectly to a replication source volume which are subsequently replicated to the replication target volume. According to another embodiment, bi-directional replication is provided and access to both replication source and replication target volumes are provided locally and subsequently replicated as necessary.

19 Claims, 10 Drawing Sheets

OTHER PUBLICATIONS

Pedone, F. et al., "On Transaction Liveness in Replicated Databases," Pacific Rim International Symposium on Fault-Tolerant Systems, 1997, pp. 104-109.

Popek, Gerald J. et al., "Replication in Ficus Distributed File Systems," Appeared in the Proceedings of the Workshop on Management of Replicated Data, Nov. 1990, pp. 20-25.

Skarra, Andrea et al., "A File System Interface For Concurrent Access," no date, pp. 128-133.

Tzung-Shi Chen et al., "A Fault-Tolerant Model for Replication in Distributed File Systems," proc.natl.sci.conunc. ROC(A), vol. 23, No. 3, 1999, pp. 402-410.

Honeyman, P. et al., "Communications and Consistency in Mobile File Systems," Oct. 5, 1995, pp. 1-7.

Constantdata, Data Availability Storage Software, "Constant Replicator: An Introduction," Configurations, Applications and Solutions of Constant Replicator; A White Paper; A Constant Data Technology Document, Aug. 2004, pp. 1-10.

* cited by examiner

SYSTEM AND METHOD FOR PROVIDING ACCESS TO REPLICATED DATA

CROSS-REFERENCE TO RELATED APPLICATIONS

This application is a continuation of U.S. application Ser. No. 10/322,121, filed Dec. 17, 2002 which is now U.S. Pat. No. 7,370,025, entitled "System and Method for Providing Access to Replicated Data," issued on May 6, 2008, and naming Bhushan S. Pandit as inventor. This application is incorporated by reference herein, in its entirety and for all purposes.

BACKGROUND OF THE INVENTION

1. Technical Field

The present invention relates generally to data storage. More particularly, the present invention relates to a system and method for providing access to replicated data.

2. Description of Related Art

Companies today rely to an unprecedented extent on online, frequently accessed, constantly changing data to run their businesses. Unplanned events that inhibit the availability of this data can seriously damage business operations. Additionally, any permanent data loss, from natural disaster or any other source, will likely have serious negative consequences for the continued viability of a business. Therefore, when disaster strikes, companies must be prepared to eliminate or minimize data loss, and recover quickly with useable data.

Replication is one technique utilized to minimize data loss and improve the availability of data in which a replicated copy of data is distributed and stored at one or more remote sites or nodes. In the event of a site migration, failure of one or more physical disks storing data or of a node or host data processing system associated with such a disk, the remote replicated data copy may be utilized, ensuring data integrity and availability. Replication is frequently coupled with other high-availability techniques such as clustering to provide an extremely robust data storage solution.

Replication may be performed by hardware or software and at various levels within an enterprise (e.g., database transaction, file system, or block-level access) to reproduce data from a replication source volume or disk within a primary node to a remote replication target volume or disk within a secondary node. Replication may be synchronous, where write operations are transmitted to and acknowledged by one or more secondary node(s) before completing at the application level of a primary node, or asynchronous, in which write operations are performed at a primary node and persistently queued for forwarding to each secondary node as network bandwidth allows.

One drawback associated with conventional data replication systems is that a replication target volume or disk may not typically be accessed or mounted reliably while replication is occurring. Consequently, replication operations must often be at least temporarily suspended when accessing replication target volumes or disks to prevent potentially severe errors from occurring. As a result, such volumes or disks are often underutilized or remain completely idle until site migration or device failure occurs rather than being used to perform useful "off-host processing" operations such as backup, data mining, monitoring, or the like.

Stopping replication abruptly to provide access to the replicated data not only creates a time window in which a consistent and up to date copy of data is unavailable but may also cause file system data inconsistencies because, for example, one or more file system data buffer(s) may not be flushed/updated at a replication target volume after a sudden break in the replication. Although it is anticipated that in most of the cases a file system can self-recover from inconsistencies due to a break in replication or can be manually recovered using some tools, such reliance on file system recoverability is undesirable. Moreover, such recovery would take considerable time and the changes would make a replication target volume an inexact replica of the replication source volume.

FIG. 1 illustrates a replication system block diagram providing access to a replicated target volume utilizing a read-only volume mount according to the prior art. Primary node 100*a* of the illustrated prior art embodiment includes an application 102*a* (e.g., a database, mail server, web server, etc.), a file system 104*a*, file system data buffer(s) 106*a*, a replication facility 108*a*, and a replication source volume 110*a* as shown. Replication facility 108*a* of primary node 100*a* receives data from application 102*a* and/or file system 104*a*, for example, in conjunction with the performance of a write operation, to be stored within replication source volume 110*a*. Replication facility 108*a* of primary node 100*a* then stores the received data within replication source volume 110*a* and transfers a replicated copy of the data at a block level to a corresponding replication facility 108*b* within secondary node 100*b* over a communication link 114 (e.g., an IP network, LAN or WAN) coupled between primary node 100*a* and secondary node 100*b*. Read access to data stored within replication source volume 110*a* by file system 104*a* or by application 102*a* via file system 104*a* is provided through a volume mount 112*a* local to primary node 100*a* as illustrated.

A given node can serve as a primary node/replication source volume for one application and as a secondary node/replication target volume for another application. Furthermore, for the same application program, a given node can serve as a secondary node at one point in time and as a primary node at another point in time to "cascade" replication of the data to other nodes connected via communications links. For example, a first replication may be made between nodes in different cities or states, and a node in one of the cities or states can in turn act as the primary node in replicating the data worldwide.

Each replication primary node may also have more than one replication secondary node. As used herein, a reference to the secondary node implicitly refers to all secondary nodes associated with a given primary node unless otherwise indicated as identical replication operations are typically performed on all secondary nodes.

Secondary node 100*b*, coupled to primary node 100*a* via communications link 114 includes an application 102*b* (e.g., a duplicate copy of application 102*a* or alternatively a distinct application such as a data mining, mirroring or backup application), a file system 104*b*, file system data buffer(s) 106*b*, replication facility 108*b*, and replication target volume 110*b* including a replicated copy of data stored on replication source volume 110*a*. Replication facility 108*b* receives a replicated copy of data from replication facility 108*a* over a communication link 114 and stores the replicated data copy within replication target volume blob. Read access to data stored within replication target volume 110*b* is provided through a read-only volume mount 112*b* local to secondary node 100*b* as illustrated.

When a write operation is performed on replication source volume 110*a* within primary node 100*a*, file system data (e.g., volume metadata, pending delayed writes, etc.) associated with the write operation may be temporarily stored or "cached" within file system buffer(s) 106*a* prior to being stored within replication source volume 110a and replicated to replication target volume 110b. Consequently, the transfer of a replicated copy of data (e.g., application data) from replication source volume 110a to replication target volume 110b may precede the transfer of a replicated copy of associated file system data, resulting in inconsistencies between some of the data stored within replication target volume 110b and file system data stored therein or within file system data buffer(s) 106b. This may occur for example, if communications link 114, replication facilities 108a and/or 108b, and/or primary node 100a become unavailable prior to the replication of the described file system data. Such inconsistencies can cause undesirable system panics, exceptions, faults or other errors to occur within secondary node 100b and preclude reliable access to replication target volume 110b.

FIG. 2 illustrates a replication system block diagram providing access to a replicated target volume utilizing a static point-in-time volume copy according to the prior art. Primary node 200a of the illustrated prior art embodiment includes an application 202a, a file system 204a, file system data buffer(s) 206a, a replication facility 208a, and a replication source volume 210a having read access via a volume mount 212a local to primary node 200a as described above with respect to FIG. 1. Primary node 200a is similarly coupled to secondary node 200b via communications link 214.

Secondary node 200b of the illustrated embodiment includes an application 202b (e.g., a duplicate copy of application 202a or alternatively a distinct application such as a data mining, mirroring or backup application), a file system 204b, file system data buffer(s) 206b, replication facility 208b, a replication target volume 210b including a replicated copy of data stored on replication source volume 210a, and a point in time copy of replication source volume 210a. Replication facility 208b receives a replicated copy of data from replication facility 208a over a communication link 214 and stores the replicated data copy within replication target volume 210b. When access to the replicated target volume is desired, a point in time copy 216 or "snapshot" of replication target volume 210b volume is created and accessed utilizing volume mount 212b local to secondary node 200b.

While the described technique allows replication to continue on the replication target volume 210b as a "snapshot" copy of the replicated data is accessed, the "snapshot" is merely a static, point-in-time volume image which may differ greatly from the replication target volume 210b particularly in environments where write operations and replication operations occur frequently. Moreover, the creation of such a static point in time copy 216 typically requires that no inconsistencies exist between file system data stored within secondary node 200b (e.g., within replication target volume 210b and file system data buffer(s) 206b) and data stored within replication target volume 210b. With some file systems (e.g., Microsoft Windows® NT File System) this requires that the primary node's file system 204a be dismounted to ensure that all file system data caches/buffers are flushed and that the point in time copy 216 has become consistent. In almost all cases, dismounting the primary node file system 204a requires all open files on replication source volume 210a to be closed which is extremely undesirable as it typically involves stopping any applications utilizing replication source volume 210a and ensuring there are no pending updates (e.g., write operations) to be replicated.

SUMMARY OF THE INVENTION

Disclosed is a system and method for providing access to replicated data. Embodiments of the present invention utilize a remote access file system to provide access to replicated data concurrently with replication.

According to one embodiment including unidirectional replication, access to a replicated target volume is provided using a remote access file system to perform reads locally or "directly" and to perform writes indirectly to a replication source volume which are subsequently replicated to the replication target volume.

According to another embodiment, bi-directional replication is provided and access to both replication source and replication target volumes are provided locally and subsequently replicated as necessary.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
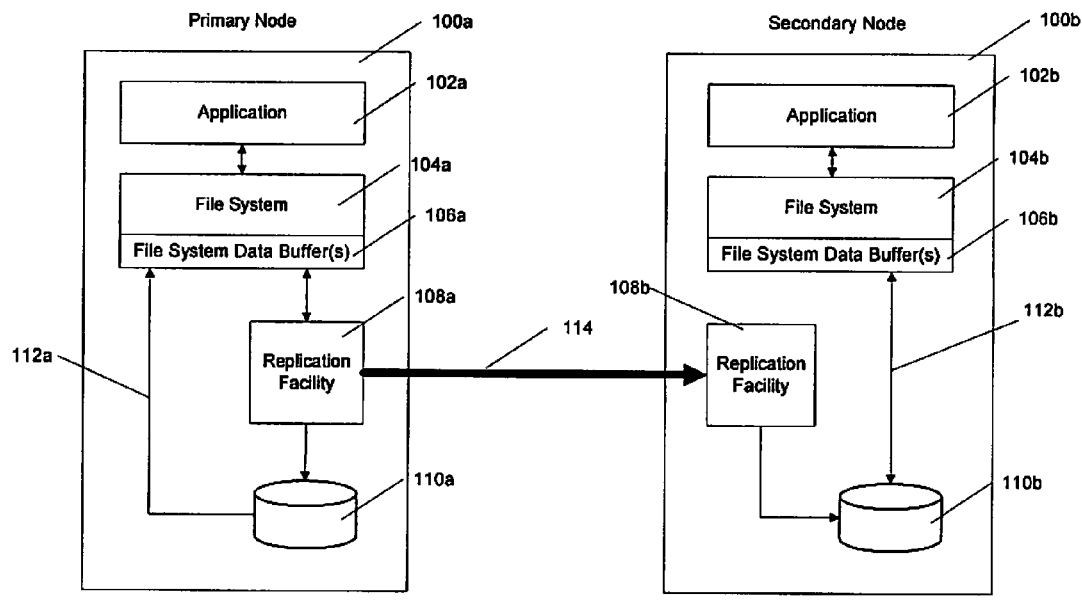
FIG. 1 illustrates a replication system block diagram providing access to a replicated target volume utilizing a read-only volume mount according to the prior art.
Figure 2:
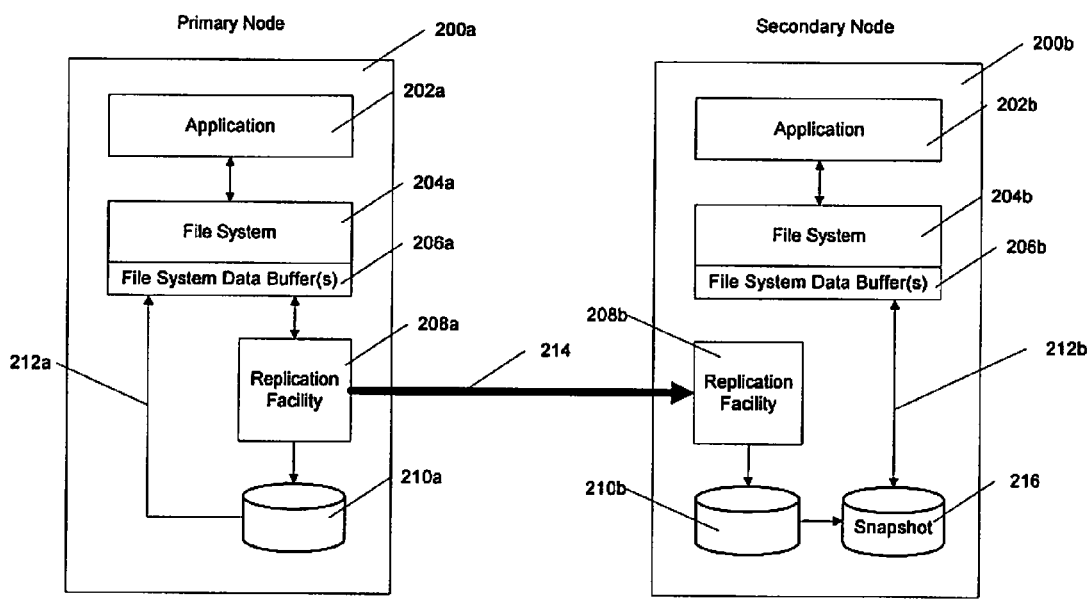
FIG. 2 illustrates a replication system block diagram providing access to a replicated target volume utilizing a static point-in-time volume copy according to the prior art.

Although the present invention has been described in connection with one embodiment, the invention is not intended to be limited to the specific forms set forth herein. On the contrary, it is intended to cover such alternatives, modifications, and equivalents as can be reasonably included within the scope of the invention as defined by the appended claims.

In the following detailed description, numerous specific details such as specific method orders, structures, elements, and connections have been set forth. It is to be understood however that these and other specific details need not be utilized to practice embodiments of the present invention. In other circumstances, well-known structures, elements, or connections have been omitted, or have not been described in particular detail in order to avoid unnecessarily obscuring this description.

References within the specification to "one embodiment" or "an embodiment" means that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Most conventional operating system platforms include one or more capabilities to share one or more disks, volumes, or directories on a communications network. There are additionally several platform-independent protocols to implement network (shared) file systems such as the Server Message Block (SMB) Protocol and Common Internet File System (CIFS) Protocol. Under such protocols, authorized applications use network shared remote access file systems after mounting them locally through provided services or commands.

Such network or remote access file systems provide file system APIs defined by a local node (e.g., a host data processing system) operating system. The remote access file system implements a client-server framework to allow file access on remote (node) file systems which is similar to access on locally mounted volumes. Achieving this with addressing efficiency, network latencies and proper interlocks typically involves complex caching and resource lock mechanisms.

On UNIX platforms, the Network File System (NFS) is the most commonly available remote access file system. On Microsoft Windows™ platforms, a network (redirected) file system is available as a default service which uses the CIFS Protocol with opportunistic locks for efficient and adaptive data coherency service. For platform-independent (e.g., UNIX and Windows) interpretability, the SMB Protocol is a popular protocol for providing remote file access through multiple implementations (e.g., Samba, EMC Celerra CIFS server, etc.). Other remote access file systems include the Andrew File System (AFS), Andrew File System II (AFSII), ARIA, and Serverless Network File Service (xFS).

As a basic feature, such protocols and remote access file systems typically provide generic file-level read and write access utilizing a communications network facility to perform file read operations and to ship write operations across. A local file system on a serving node volume centrally arbitrates file-level access for both local and remote clients (e.g., a local application using a local file system volume mount and/or a remote application using a remote access file system (client) volume mount). Alternatively such functionality for network shares (e.g., mapping, locking and access arbitration of the volume blocks for a file) may be supported directly within a file system rather than within an independent server component. Embodiments of the present invention described herein integrate remote access file system and data replication functionality to provide safe and reliable (direct) access to replicated data concurrently with replication.

Figure 3:
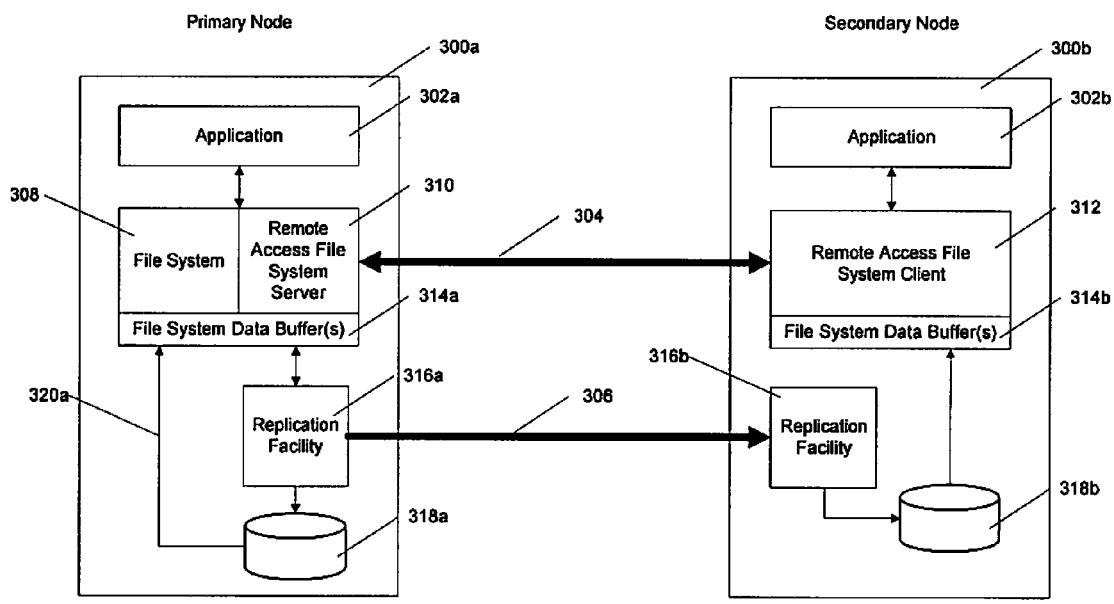
FIG. 3 illustrates a replication system block diagram providing access to a replicated target volume utilizing a remote access file system and unidirectional replication according to an embodiment of the present invention.

FIG. 3 illustrates a replication system block diagram providing access to a replicated target volume utilizing a remote access file system and unidirectional replication according to an embodiment of the present invention. The operation of the replication system depicted in FIG. 3 will be described further herein with respect to FIGS. 5-9. The illustrated replication system includes a primary node 300a and a secondary node 300b coupled together utilizing a remote access file system communications link 304 and a replication communications link 306 as shown. While separate communications links 304 and 306 have been illustrated in the embodiment of FIG. 3, it should be appreciated that in alternative embodiments of the present invention such communication links may be implemented in any number and/or combination of logical and physical communication links, channels, or media.

Primary node 300a of the illustrated embodiment includes an application 302a (e.g., a database, mail server, web server, etc), a file system 308, a remote access file system server 310, one or more file system buffer(s) 314a (e.g., file system metadata and/or buffer caches), a replication facility 316a, and a replication source volume 318a. Secondary node 300b of the illustrated embodiment includes an application 302b (e.g., a duplicate copy of application 302a or alternatively a distinct application such as a data mining, mirroring or backup application), a remote access file system client 312, file system data buffer(s) 314b, replication facility 316b, and replication target volume 318b including a replicated copy of data stored on replication source volume 318a.

Access to data stored within replication target volume 318b is provided in the illustrated embodiment utilizing a remote access file system comprising remote access file system server 310 and remote access file system client 312. According to one embodiment, access to a replicated copy of data within replication target volume 318b is provided concurrently with replication from the replication source volume 318a to the replication target volume 318b utilizing replication facilities 316a and 316b.

In the illustrated embodiment, replication communications link 306 is utilized to transfer copies of replicated data (e.g., application data file system data, etc.) unidirectionally from replication source volume 318a to a replication target volume 318b utilizing replication facilities 316a and 316b. Similarly, remote access file system communications link 304 is utilized to transfer updates (e.g., write operations) originating within secondary node 300b unidirectionally from remote access file system client 312 to remote access file system server 310 and to transfer file system data (e.g., file system metadata, resource locks, notifications, etc.) bidirectionally between remote access file system server 310 and remote access file system client 312.

Remote access file system server 310 in one embodiment is utilized to arbitrate access to replication source volume 318a by application 302a, file system 308, remote access file system client 312, and application 300b via remote access file system client 312. Accordingly, replication facility 316a receives data, for example, in conjunction with the performance of a write operation, following such arbitration to be stored within replication source volume 318a. Replication facility 316a of primary node 300a in turn stores the received data within replication source volume 318a and transfers a replicated copy of the data, at a block level, to a corresponding replication facility 316b within secondary node 300b over replication communication link 306 (e.g., an IP network, LAN or WAN).

Replication facility 316b within secondary node 300b receives a replicated copy of data from replication facility 316a over replication communication link 306 and stores the replicated data copy within replication target volume 318b. According to one embodiment, the described replication is performed synchronously. In another embodiment, asynchronous replication is performed coupled with a lookup/query facility to check the replication status of updated (e.g., modified or "dirty") data blocks. Direct read access to replicated copies of data stored within replication target volume 318b by remote access file system client 312 is provided through a volume mount 320b local to secondary node 300b as illustrated.

A write operation to a copy of replicated data stored within replication target volume 318b by contrast is actually performed on the original data stored within replication source volume 318a and subsequently replicated to replication target volume 318b. Accordingly, data received by remote access file system client 312 which is associated with a write operation is transferred from remote access file system client 312 to remote access file system server 310 via remote access file system communications link 304 and subsequently written by remote access file system server 310 and replication facility 316a to replication source volume 318a and thereafter replicated.

Integrating remote access file system and block-level data replication functionality according to one embodiment of the present invention utilizes remote access file system arbitration and resource locking and a file to volume block mapping facility. Such a mapping facility may be built-in or embedded/extended within a default underlying remote access file system protocol. In another embodiment, such a facility is available either through operating system virtualization of file system allocations (e.g., vnodes on UNIX) or through third-party file system tools such as APIs useable for writing defragmenters (e.g., NTFS on Windows platforms). Consequently, utilizing techniques described herein, arbitrated remote access of replicated data copies on volumes of a secondary node/site including online verification and more efficient and direct local access to replicated data copies may be provided during replication without disturbing volume replication or using a static snapshot of the volume.

Figure 4:
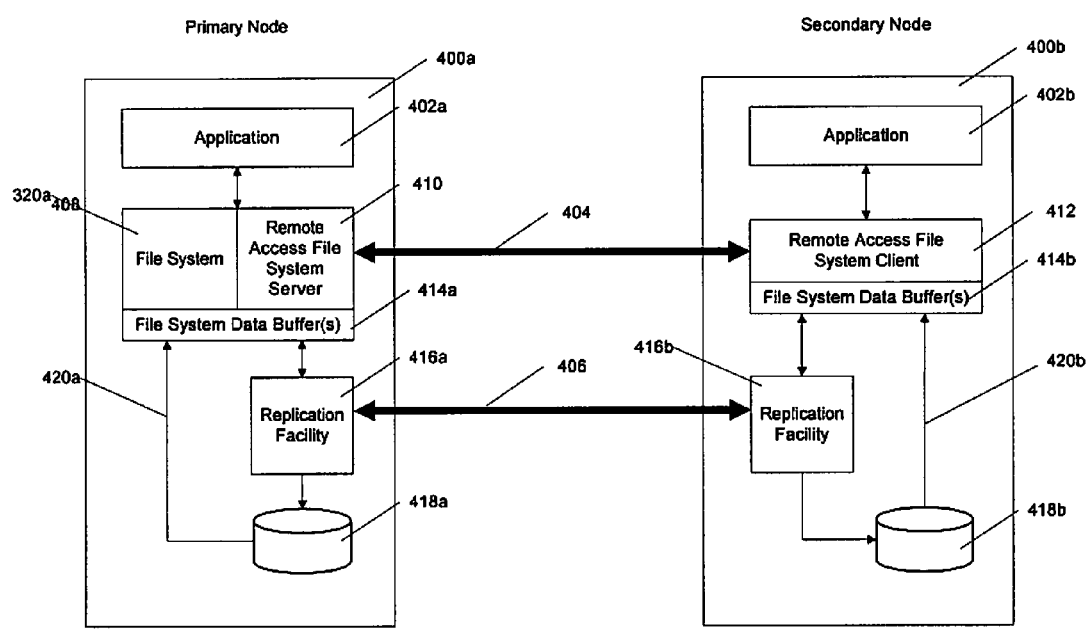
FIG. 4 illustrates a replication system block diagram providing access to a replicated target volume utilizing a remote access file system and bidirectional replication according to an embodiment of the present invention.

FIG. 4 illustrates a replication system block diagram providing access to a replicated target volume utilizing a remote access file system and bidirectional replication according to an embodiment of the present invention. The operation of the replication system depicted in FIG. 4 will be described further herein with respect to FIG. 10. The illustrated replication system includes a primary node 400a and a secondary node 400b coupled together utilizing a remote access file system communications link 404 and a replication communications link 406 as described with respect to FIG. 3.

Primary node 400a of the illustrated embodiment includes an application 402a (e.g., a database, mail server, web server, etc), a file system 408, a remote access file system server 410, one or more file system buffer(s) 414a (e.g., file system metadata and/or buffer caches), a replication facility 416a, and a replication source volume 418a. Secondary node 400b of the illustrated embodiment includes an application 402b (e.g., a duplicate copy of application 402a or alternatively a distinct application such as a data mining, mirroring or backup application), a remote access file system client 412, file system data buffer(s) 414b, replication facility 416b, and replication target volume 418b including a replicated copy of data stored on replication source volume 418a.

Primary node 400a and secondary node 400b operate in substantially the same way as primary node 300a and secondary node 300b of FIG. 3. However, replication communications link 406 of the embodiment illustrated in FIG. 4 is utilized to transfer copies of replicated data (e.g., application data file system data, etc.) bidirectionally between replication source volume 418a and replication target volume 418b utilizing replication facilities 416a and 416b. Consequently, a write operation to a copy of replicated data stored within replication target volume 418b may be performed directly to the copy of replicated data and subsequently replicated to replication source volume 418b utilizing replication communications link 406. In the described embodiment the terms "replication source volume" and "replication target volume" are rendered arbitrary and have been used merely for consistency and comparison with the embodiment of FIG. 3 as both volumes 418a and 418b will be alternately a "source" and a "target" as the bi-directional replication is performed.

Figure 5:
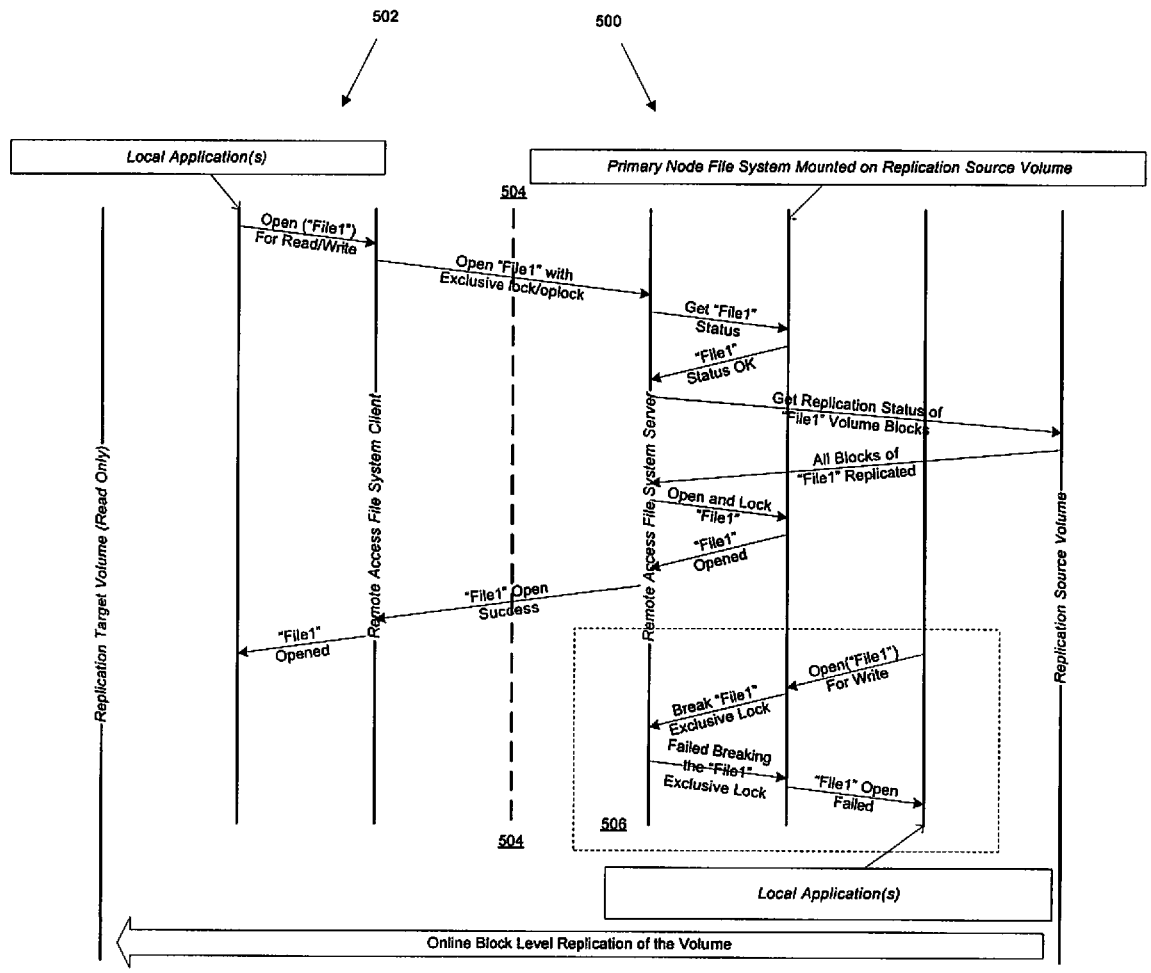
FIG. 5 illustrates a replicated data file open process in a unidirectional data replication system according to an embodiment of the present invention.

FIG. 5 illustrates a replicated data file open process in a unidirectional data replication system according to an embodiment of the present invention. The replication system of the illustrated embodiment includes a primary node 500 and a secondary node 502 such as primary node 300a and secondary node 300b, respectively, of FIG. 3 whose physical and/or functional boundary is delineated using vertical dashed line 504. Primary node 500 of the depicted embodiment includes a replication source volume, one or more local applications, a primary node file system mounted on the replication source volume, and a remote access file system server. Similarly, secondary node 502 of the embodiment of FIG. 5 includes a replication target volume, one or more local applications, and a remote access file system client.

The file open process of the illustrated embodiment, performed concurrently with block-level replication of data from replication source to replication target volumes as shown, begins as a local application within secondary node 502 transfers a file open request for a file (e.g., "File1" in the embodiment illustrated by FIG. 5) to the remote access file system client. The remote access file system client thereafter transfers a file open request including a resource lock (e.g., a CIFS-formatted file open request including an opportunistic lock such as an exclusive lock, batch lock, or level II lock) to the remote access file system server. The remote access file system server receives the file open request and responsively requests and receives file status information (e.g., regarding whether the file is currently already open) from the primary node file system mounted on the replication source volume for the file to be opened.

Once the relevant file's status has been established, the remote access file system server request and receives replication status for volume blocks of the file to be opened from the replication source volume to determine whether or not the blocks associated with the file have been replicated. The remote access file system server then transfers a request to open and lock the file and receives confirmation that the file was been opened and the resource lock has been established from the primary node file system. The remote access file system server then transfers a message indicating that the file was successfully opened to the remote access file system client which in turn forwards or otherwise indicates this success to the original requesting local application.

Once a file has been opened and the resource lock established the file may not be opened and/or modified by another application (e.g., an application local to the primary node) as shown by the interaction between local application, primary node file system, and remote access file system server illustrated within block 506 of FIG. 5. In the illustrated exchange, an application local to the primary node transfers a request to open the previously opened and "locked" file to the primary node file system which in turn requests that the remote access file system server break the established resource lock. The remote access file system server then transfers a message indicating a failure to break the resource lock associated with the file to the primary node file system which in turn forwards or otherwise indicates a failure to open the file to the requesting local application. Other applications are consequently prevented from modifying data stored within the replication source volume temporarily while replication is occurring using the described process.

Figure 6:
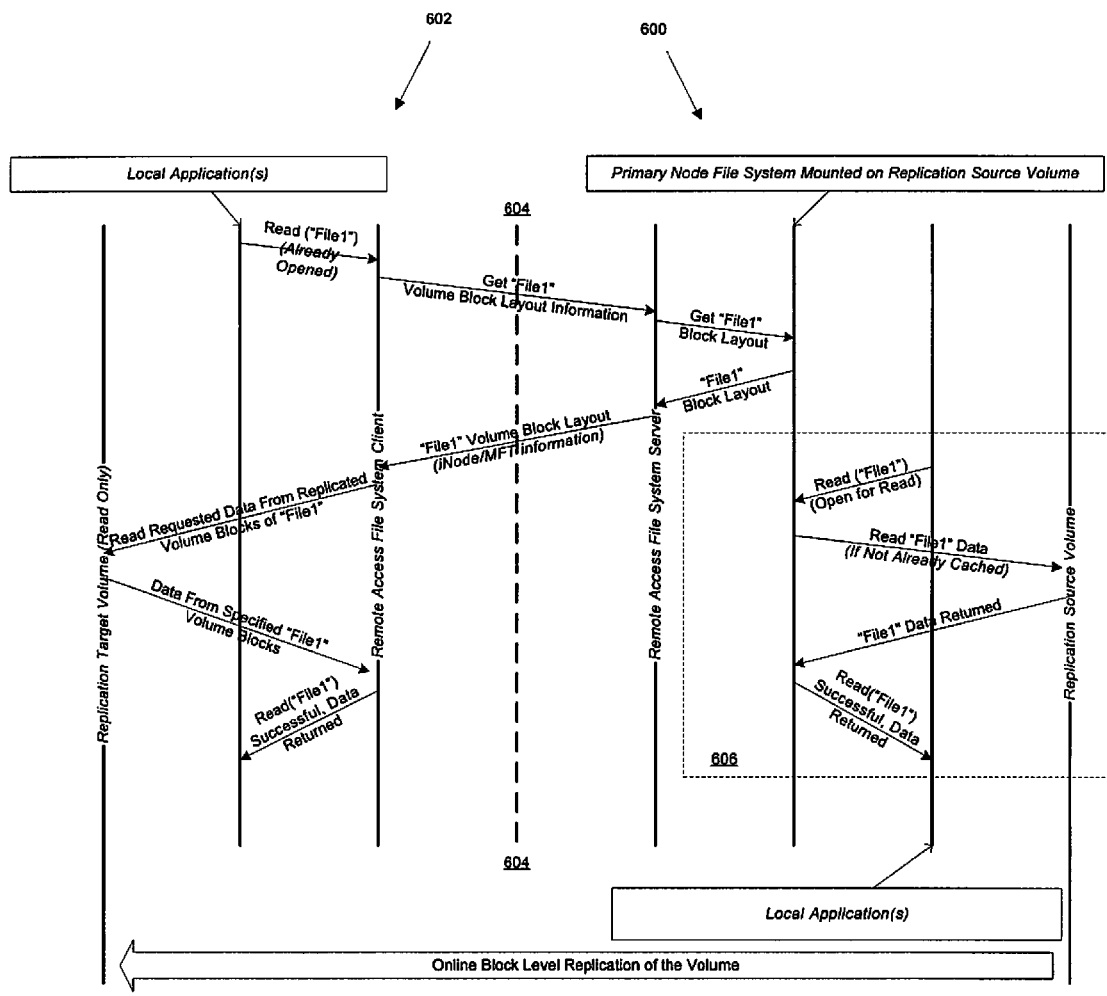
FIG. 6 illustrates a replicated data file read process in a unidirectional data replication system according to an embodiment of the present invention.

FIG. 6 illustrates a replicated data file read process in a unidirectional data replication system according to an embodiment of the present invention. The replication system of the illustrated embodiment includes a primary node 600 and a secondary node 602 such as primary node 300*a* and secondary node 300*b*, respectively, of FIG. 3 whose physical and/or functional boundary is delineated using vertical dashed line 604. Primary node 600 of the depicted embodiment includes a replication source volume, one or more local applications, a primary node file system mounted on the replication source volume, and a remote access file system server. Similarly, secondary node 602 of the embodiment of FIG. 6 includes a replication target volume, one or more local applications, and a remote access file system client.

The file read process of the illustrated embodiment, performed concurrently with block-level replication of data from replication source to replication target volumes as shown, begins as a local application within secondary node 602 transfers a file read request for an open file (e.g. "File1" in the embodiment illustrated by FIG. 6) to the remote access file system client. The remote access file system client thereafter transfers a request for volume block layout information (e.g., iNode and/or Master File Table (MFT) information) describing the relationship or "mapping" between a file and its associated blocks of data within a volume for the file to be read to the remote access file system server. The remote access file system server in turn requests and receives the described volume block layout information from the primary node file system and forwards it to the remote access file system client as shown.

The retrieved volume block layout information is then utilized by the remote file system client to perform a local or "direct" read operation on the replication target volume within secondary node 602. In the illustrated embodiment, the retrieved volume block layout information is utilized to generate a read request for data within the volume blocks of the file to be read which is transferred to the replication target volume. The replication target volume then fulfills the read request, transferring the requested data back to the remote access file system client which forwards the data to the requesting local application with an indication that the read operation was performed successfully.

Data from the file read within the illustrated process (e.g., "File1" of the depicted embodiment) may be concurrently read by local applications within primary node 600 from the replication source volume as shown by the interaction between local application, primary node file system, and replication source volume illustrated within block 606 of FIG. 6. In the illustrated exchange, an application local to primary node 600 transfers a read request for the subject file to the primary node file system which forwards the read request to the replication source volume if the file in question is not available to the primary node file system in cache. The replication source volume fulfills the read request, transferring the requested file or a portion thereof to the primary node file system which forwards the file/data to the requesting local application with an indication that the read operation was performed successfully.

Figure 7:
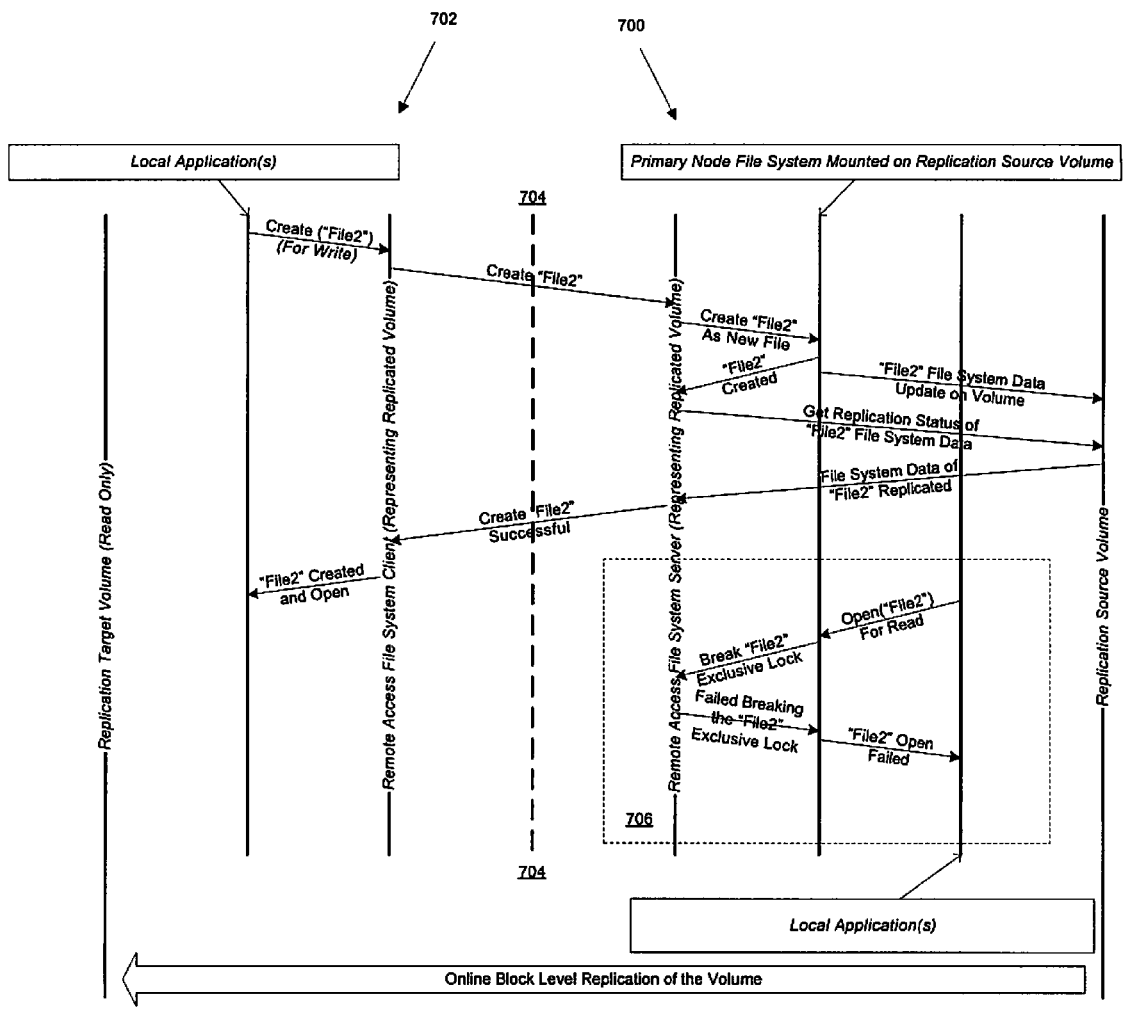
FIG. 7 illustrates a replicated data file creation process in a unidirectional data replication system according to an embodiment of the present invention.

FIG. 7 illustrates a replicated data file creation process in a unidirectional data replication system according to an embodiment of the present invention. The described process may be utilized in various alternative embodiments of the present invention to provide for the creation of a new, not previously existing file and/or the opening of an existing file by truncating. The replication system of the illustrated embodiment includes a primary node 700 and a secondary node 702 such as primary node 300*a* and secondary node 300*b*, respectively, of FIG. 3 whose physical and/or functional boundary is delineated using vertical dashed line 704. Primary node 700 of the depicted embodiment includes a replication source volume, one or more local applications, a primary node file system mounted on the replication source volume, and a remote access file system server. Similarly, secondary node 702 of the embodiment of FIG. 7 includes a replication target volume, one or more local applications, and a remote access file system client.

The file creation process of the illustrated embodiment, performed concurrently with block-level replication of data from replication source to replication target volumes as shown, begins as a local application within secondary node 702 transfers a file creation request for a file (e.g., "File2" in the embodiment illustrated by FIG. 7) to the remote access file system client. The remote access file system client thereafter transfers the request to the remote access file system server which in turn interacts with the primary node file system as shown to create the requested new file.

After indicating to the remote access file system server that the file has been created, the primary node file system requests/performs an update of the created file's file system date (e.g. metadata) on the replication source volume. Thereafter, the remote access file system server requests the replication status of the file's file system data, receives a reply from the replication source volume indicating that replication has occurred, and transfers a message to the remote access file system client indicating that the file was successfully created as depicted in FIG. 7. The described process is then completed as the remote access file system client responsively indicates the successful creation and opening of the file to the requesting local application.

In the illustrated embodiment, a request (e.g., by an application local to primary node 700) to open the described file for reads after it has been created results in failure as shown by the interaction between local application, primary node file system, and replication source volume illustrated within block 706 of FIG. 7. In the illustrated exchange, an application local to the primary node 700 transfers a request to open the previously created file to the primary node file system which in turn requests that the remote access file system server break the file's resource lock. The remote access file system server then transfers a message indicating a failure to break the resource lock associated with the file to the primary node file system which in turn forwards or otherwise indicates a failure to open the file to the requesting local application. In an alternative embodiment in which the remote access file system protocol implemented does not require the resource lock to be broken in this situation however, the described file open operation may be successfully performed.

Figure 8:
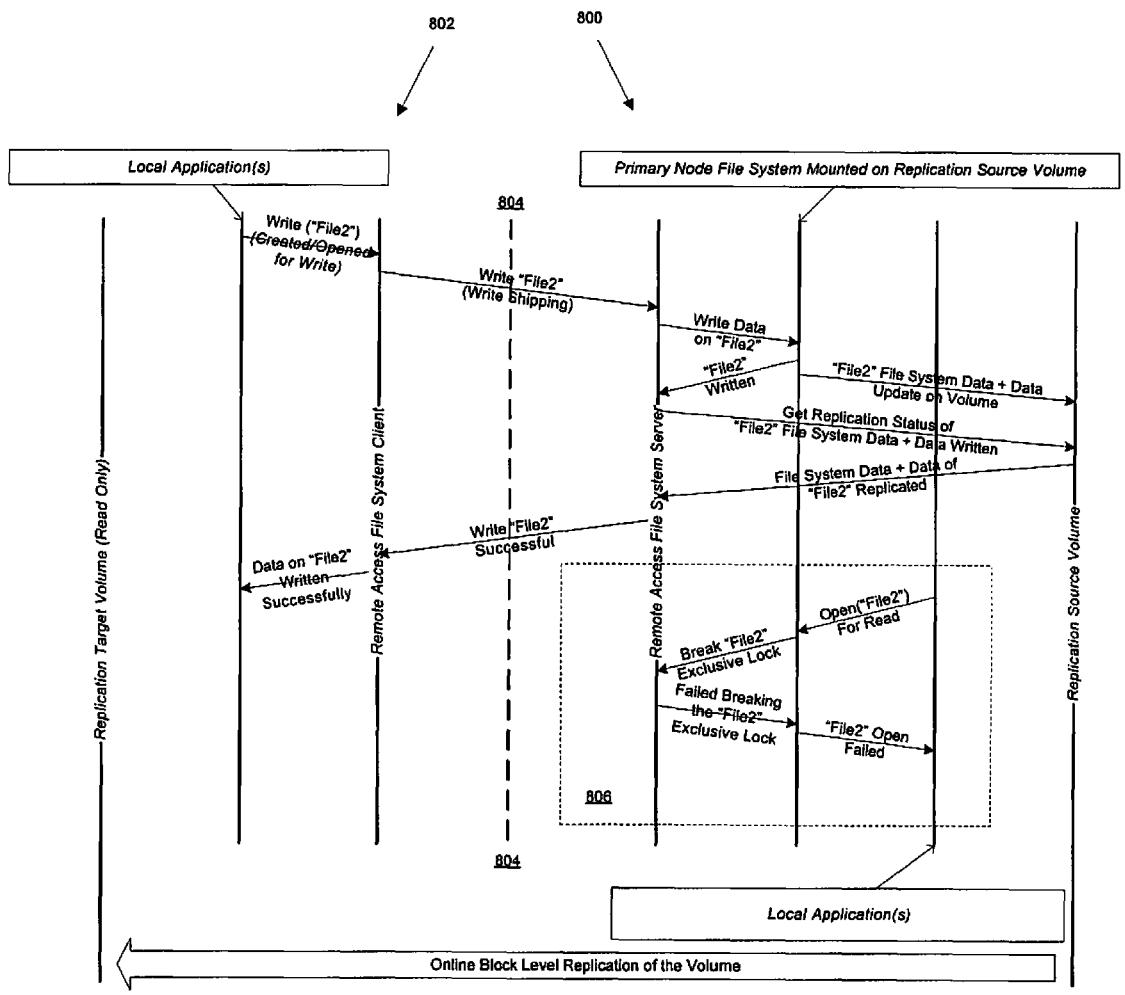
FIG. 8 illustrates a replicated data file write/append process in a unidirectional data replication system according to an embodiment of the present invention.

FIG. 8 illustrates a replicated data file write/append process in a unidirectional data replication system according to an embodiment of the present invention. The described process may be utilized in various alternative embodiments of the present invention to provide for writing to a file to overwrite existing data and/or appending data to a file resulting in the growth or expansion of the file. The replication system of the illustrated embodiment includes a primary node 800 and a secondary node 802 such as primary node 300*a* and secondary node 300*b*, respectively, of FIG. 3 whose physical and/or functional boundary is delineated using vertical dashed line 804. Primary node 800 of the depicted embodiment includes a replication source volume, one or more local applications, a primary node file system mounted on the replication source volume, and a remote access file system server. Similarly, secondary node 802 of the embodiment of FIG. 8 includes a replication target volume, one or more local applications, and a remote access file system client.

The file write/append process of the illustrated embodiment, performed concurrently with block-level replication of data from replication source to replication target volumes as shown, begins as a local application within secondary node 802 transfers a file write/append request for a file (e.g., "File2" in the embodiment illustrated by FIG. 8) to the remote access file system client. The remote access file system client thereafter transfers the request to the remote access file system server which in turn interacts with the primary node file system as shown to write/append data to the specified file as shown.

After indicating to the remote access file system server that the file has been written, the primary node file system requests/performs an update of the file's data (e.g., application data) and file system date (e.g., metadata) on the replication source volume. The remote access file system server then requests the replication status of the file's data and file system data, receives a reply from the replication source volume indicating that replication has occurred, and transfers a message to the remote access file system client indicating that the file was successfully created as depicted in FIG. 8. The described process is then completed as the remote access file system client responsively indicates the successful write/append operation to the requesting local application.

In the illustrated embodiment, a request (e.g., by an application local to primary node 800) to open the described file for reads after it has been written/appended to results in failure as shown by the interaction between local application, primary node file system, and replication source volume illustrated within block 806 of FIG. 8. In the illustrated exchange, an application local to the primary node 800 transfers a request to open the previously written/appended file to the primary node file system which in turn requests that the remote access file system server break the file's resource lock. The remote access file system server then transfers a message indicating a failure to break the resource lock associated with the file to the primary node file system which in turn forwards or otherwise indicates a failure to open the file to the requesting local application. In an alternative embodiment in which the remote access file system protocol implemented does not require the resource lock to be broken in this situation however, such a file open operation may be successfully performed.

Figure 9:
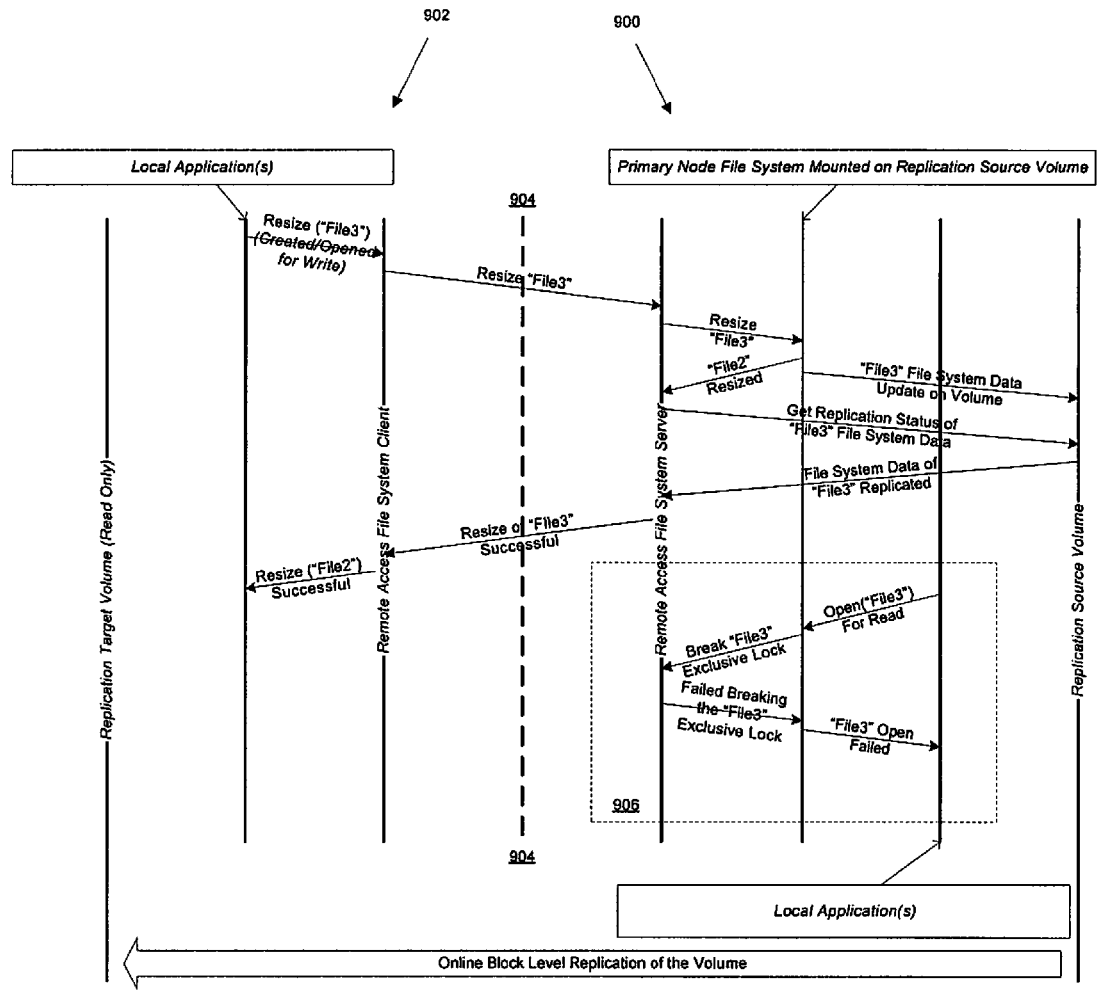
FIG. 9 illustrates a replicated data file resize process in a unidirectional data replication system according to an embodiment of the present invention.

FIG. 9 illustrates a replicated data file resize process in a unidirectional data replication system according to an embodiment of the present invention. The described process may be utilized in various alternative embodiments of the present invention to provide for physically growing/expanding an existing file to claim more space, physically shrinking/contracting an existing file to reduce its size, and/or logically growing and/or shrinking a sparse (physically non-contiguous) file to claim and/or release its physical space. The replication system of the illustrated embodiment includes a primary node 900 and a secondary node 902 such as primary node 300*a* and secondary node 300*b*, respectively, of FIG. 3 whose physical and/or functional boundary is delineated using vertical dashed line 904. Primary node 900 of the depicted embodiment includes a replication source volume, one or more local applications, a primary node file system mounted on the replication source volume, and a remote access file system server. Similarly, secondary node 902 of the embodiment of FIG. 9 includes a replication target volume, one or more local applications, and a remote access file system client.

The file resize process of the illustrated embodiment, performed concurrently with block-level replication of data from replication source to replication target volumes as shown, begins as a local application within secondary node 902 transfers a file resize request for a file (e.g., "File3" in the embodiment illustrated by FIG. 9) to the remote access file system client. The remote access file system client thereafter transfers the request to the remote access file system server which in turn interacts with the primary node file system as shown to resize the file as shown.

After indicating to the remote access file system server that the file has been resized, the primary node file system requests/performs an update of the file's file system date (e.g., metadata) on the replication source volume. The remote access file system server then requests the replication status of the file's file system data, receives a reply from the replication source volume indicating that replication has occurred, and transfers a message to the remote access file system client indicating that the file was successfully resized as depicted in FIG. 9. The described process is then completed as the remote access file system client responsively indicates the successful resize operation to the requesting local application.

In the illustrated embodiment, a request (e.g., by an application local to primary node 900) to open the described file for reads after it has been resized results in failure as shown by the interaction between local application, primary node file system, and replication source volume illustrated within block 906 of FIG. 9. In the illustrated exchange, an application local to the primary node 900 transfers a request to open the previously resized file to the primary node file system which in turn requests that the remote access file system server break the file's resource lock. The remote access file system server then transfers a message indicating a failure to break the resource lock associated with the file to the primary node file system which in turn forwards or otherwise indicates a failure to open the file to the requesting local application. In an alternative embodiment in which the remote access file system protocol implemented does not require the resource lock to be broken in this situation however, such a file open operation may be successfully performed.

It should be readily appreciated that while specific elements of primary nodes 500, 600, 700, 800 and 900 and secondary nodes 502, 602, 702, 802 and 902 have been illustrated, such elements are not necessary to practice or implement alternative embodiments of the present invention and that method embodiments of the present invention may be practiced which are devoid of an association with any particular structure. Moreover, it should also be appreciated that while the interactions associated with blocks 506, 606, 706, 806 and 906 have been depicted and described, that such interactions are similarly not necessary to practice embodiments of the present invention.

Figure 10:
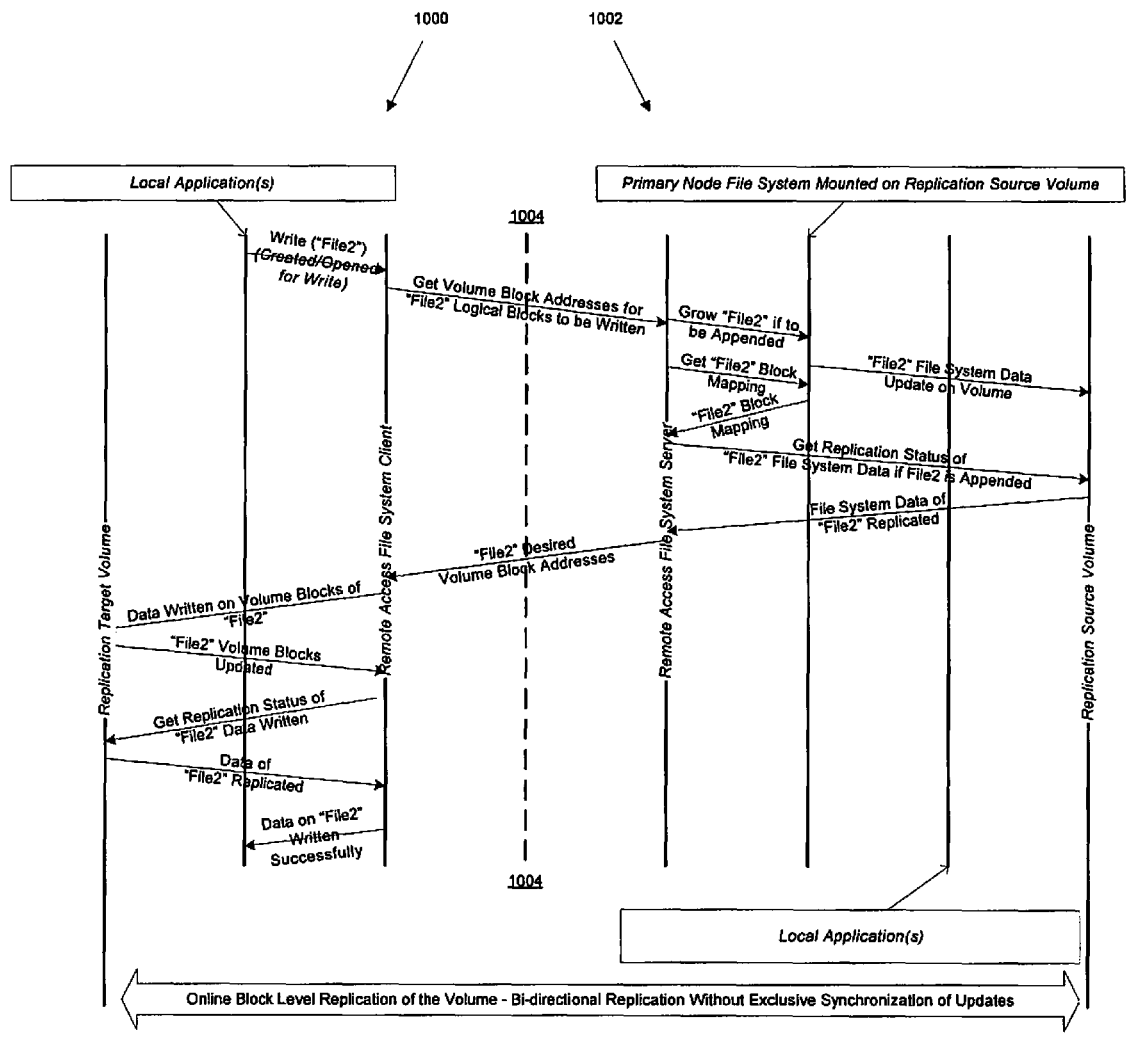
FIG. 10 illustrates a replicated data file write process in a bidirectional data replication system according to one embodiment of the present invention.

FIG. 10 illustrates a replicated data file write process in a bidirectional data replication system according to one embodiment of the present invention. The described process may be utilized in various alternative embodiments of the present invention to provide for overwriting existing data within a file and/or appending data to a file to grow or expand the file. The replication system of the illustrated embodiment includes a primary node 1000 and a secondary node 1002 such as primary node 400*a* and secondary node 400*b*, respectively, of FIG. 4 whose physical and/or functional boundary is delineated using vertical dashed line 1004. Primary node 1000 of the depicted embodiment includes a replication source volume, one or more local applications, a primary node file system mounted on the replication source volume, and a remote access file system server. Similarly, secondary node 1002 of the embodiment of FIG. 10 includes a replication target volume, one or more local applications, and a remote access file system client.

The file write/append process of the illustrated embodiment, performed concurrently with bi-directional block-level replication of data between replication volumes as shown, begins as a local application within secondary node 1002 transfers a file write/append request for a file (e.g., "File2" in the embodiment illustrated by FIG. 10) to the remote access file system client. The remote access file system client thereafter transfers a request for volume block addresses of the logical blocks associated with the file to be written to the remote access file system server which in turn interacts with the primary node file system as shown to write/append to the file as shown.

The remote access file system server first transfers a request to grow the relevant file as necessary if an append operation is to be performed. Thereafter, the primary node file system requests/performs an update of the file's file system data on the replication source volume and the remote access file system server requests and receives the file's volume block mapping from the primary node file system. Once the file's volume block mapping is obtained, the remote access file system server requests the replication status of the file's file system data, receives a reply from the replication source volume indicating that replication has occurred, and transfers a message to the remote access file system client indicating the file's relevant volume block addresses.

The volume block addresses are received by the remote access file system client and subsequently utilized to perform the write/append operation. The remote access file system client performs and receives confirmation of the write operation on the secondary node's replication volume before requesting the replication status of the written data (e.g., application data). Once it is determined that the replication has occurred, the described process is completed as the remote access file system client indicates the successful write/append operation to the original requesting local application. It should be readily appreciated that while specific elements of primary node 1000 and secondary node 1002 have been illustrated, such elements are not necessary to practice or implement alternative embodiments of the present invention and that method embodiments of the present invention may be practiced which are devoid of an association with any particular structure.

Figure 11:
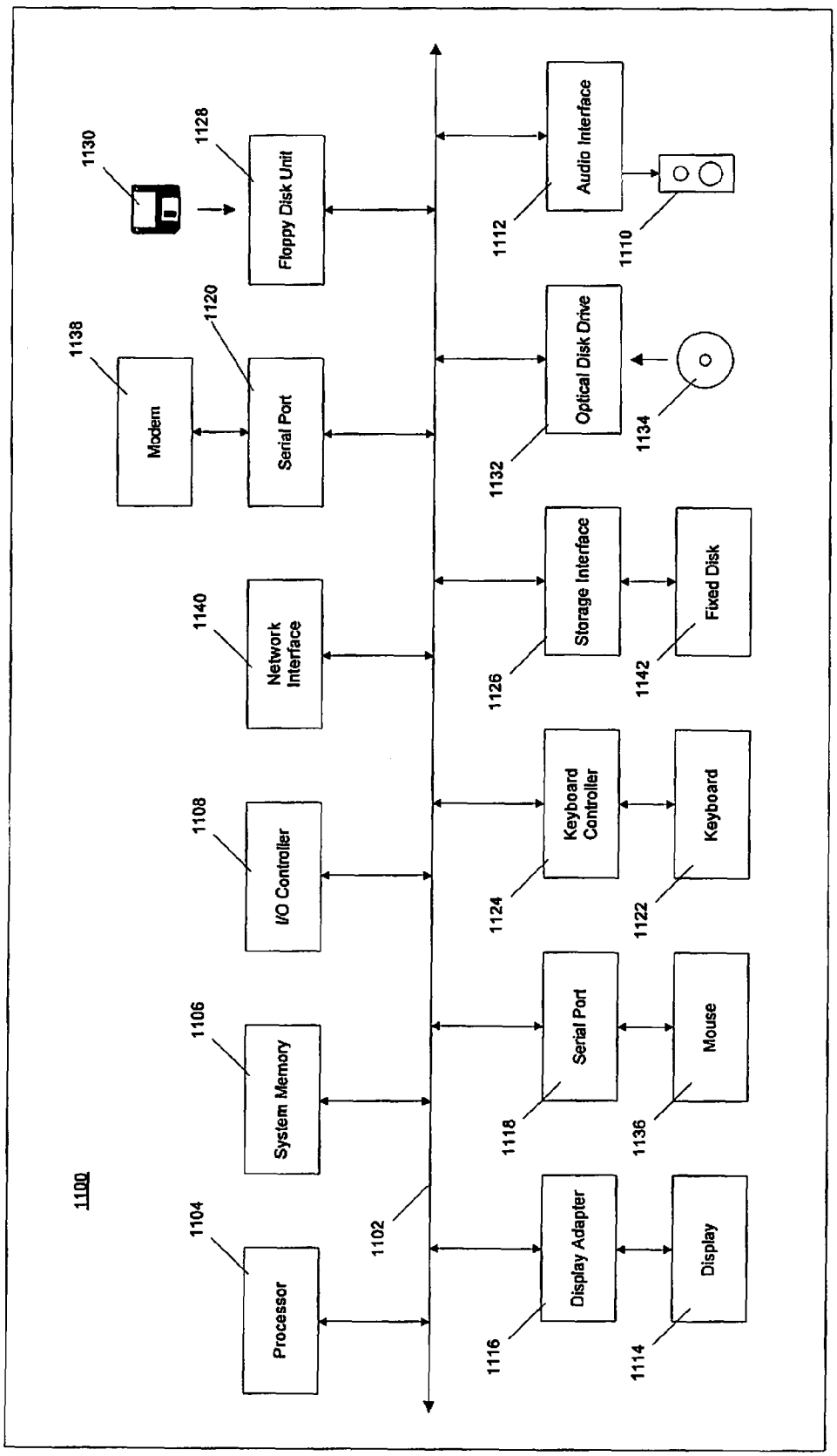
FIG. 11 illustrates an exemplary primary and/or secondary node system block diagram useable with one or more embodiments of the present invention.

FIG. 11 illustrates an exemplary primary and/or secondary node system block diagram useable with one or more embodiments of the present invention. Computer system 1100 includes a bus 1102 which interconnects major subsystems of computer system 1100 such as a central processor 1104, a system memory 1106 (typically RAM, but which may also include ROM, flash RAM, or the like), an input/output controller 1108, an external audio device such as a speaker system 1110 via an audio output interface 1112, an external device such as a display screen 1114 via display adapter 1116, serial ports 28 and 30, a keyboard 1122 (interfaced with a keyboard controller 1124), a storage interface 1126, a floppy disk drive 36 operative to receive a floppy disk 1130, and a CD-ROM drive 1132 operative to receive a CD-ROM 1134. Also included are a mouse 1136 (or other point-and-click device, coupled to bus 1102 via serial port 1118), a modem 1138 (coupled to bus 1102 via serial port 1120) and a network interface 1140 (coupled directly to bus 1102).

Bus 1102 allows data communication between central processor 1104 and system memory 1106, which may include both read only memory (ROM) or flash memory (neither shown), and random access memory (RAM) (not shown), as previously noted. The RAM is generally the main memory into which the operating system and application programs are loaded and typically affords at least 16 megabytes of memory space. The ROM or flash memory may contain, among other code, the Basic Input-Output system (BIOS) which controls basic hardware operation such as the interaction with peripheral components. Applications resident with computer system 1100 are generally stored on and accessed via a computer readable medium, such as a hard disk drive (e.g., fixed disk 1142), an optical drive (e.g., CD-ROM drive 1132), floppy disk unit 1128 or other storage medium. Additionally, applications may be in the form of electronic signals modulated in accordance with the application and data communication technology when accessed via network modem 1138 or interface 1140.

Storage interface 1126, as with the other storage interfaces of computer system 1100, may connect to a standard computer readable medium for storage and/or retrieval of information, such as a fixed disk drive 1142. Fixed disk drive 1142 may be a part of computer system 1100 or may be separate and accessed through other interface systems. Many other devices can be connected such as a mouse 1136 connected to bus 1102 via serial port 1118, a modem 1138 connected to bus 1102 via serial port 1120 and a network interface 1140 connected directly to bus 1102. Modem 1138 may provide a direct connection to a remote server via a telephone link or to the Internet via an internet service provider (ISP). Network interface 1140 may provide a direct connection to a remote server via a direct network link to the Internet via a POP (point of presence). Network interface 1140 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 11 to be present to practice the present invention. The devices and subsystems may be interconnected in different ways from that shown in FIG. 11. The operation of a computer system such as that shown in FIG. 11 is readily known in the art and is not discussed in detail in this application. Code to implement the present invention may be stored in computer-readable storage media such as one or more of system memory 1106, fixed disk 1142, CD-ROM 1134, or floppy disk 1130. Additionally, computer system 1100 may be any kind of computing device, and so includes personal data assistants (PDAs), network appliances, X-window terminals or other such computing devices. The operating system provided on computer system 1100 may be MS-DOS®, MS-WINDOWS®, OS/2®, UNIX®, Linux® or other known operating system. Computer system 1100 also supports a number of Internet access tools, including, for example, an HTTP-compliant web browser.

Moreover, regarding the messages and/or data signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above-described embodiment are characterized as transmitted from one block or element to the next, other embodiments of the present invention may include modified signals in place of such directly transmitted signals as long as the informational and/or functional aspect of the signal is transmitted.

The foregoing detailed description has set forth various embodiments of the present invention via the use of block diagrams, process diagrams, and examples. It will be understood by those within the art that each block diagram component, process diagram block, operation and/or component illustrated by the use of examples can be implemented, individually and/or collectively, by a wide range of hardware, software, firmware, or any combination thereof.

The present invention has been described in the context of fully functional computer systems; however, those skilled in the art will appreciate that the present invention is capable of being distributed as a program product in a variety of forms, and that the present invention applies equally regardless of the particular type of signal bearing media used to actually carry out the distribution. Examples of signal bearing or machine-accessible media include recordable media such as floppy disks and CD-ROM, transmission type media such as digital and analog communications links, as well as media storage and distribution systems developed in the future.

The above-discussed embodiments may be implemented by software modules that perform certain tasks. The software modules discussed herein may include script, batch, or other executable files. The software modules may be stored on a machine-accessible or computer-accessible storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a processor/memory system. Thus, the modules may be stored within a computer system memory to configure the computer system to perform the functions of the module. Other new and various types of computer-readable storage media may be used to store the modules discussed herein.

The above description is intended to be illustrative of the invention and should not be taken to be limiting. Other embodiments within the scope of the present invention are possible. Those skilled in the art will readily implement the steps necessary to provide the structures and the methods disclosed herein, and will understand that the process parameters and sequence of steps are given by way of example only and can be varied to achieve the desired structure as well as modifications that are within the scope of the invention. Variations and modifications of the embodiments disclosed herein can be made based on the description set forth herein, without departing from the scope of the invention.

Consequently, the invention is intended to be limited only by the scope of the appended claims, giving full cognizance to equivalents in all respects.

What is claimed is:

1. A method comprising:
   replicating data between a first volume and a second volume, wherein
      said replicating is performed in response to storage of said data,
      said replicating creates a replicated copy of said data,
      said replicating is bi-directional between said first volume and said second volume,
      said first volume is associated with a first node,
      said second volume is associated with a second node, and
      said replicating facilitates
         bi-directionally replicating said data between said first node and said second node; and
   providing access to said replicated copy of said data, wherein
      said access is provided concurrently with said replicating,
      said access is provided utilizing a remote access file system,
      said access is provided via a remote access file system client,
      said remote access file system client is local to a one of said first volume and said second volume,
      said providing comprises
         arbitrating said access,
      said arbitrating said access comprises
         arbitrating access to said data by establishing a resource lock for said data,
      said arbitrating is performed by a remote access file system server, and
      said remote access file system server is local to another of said first volume and said second volume.

2. The method of claim 1, wherein
   said replicating further comprises
      replicating said data from said first node to said second node.

3. The method of claim 1, wherein said providing comprises:
   receiving an access request for said replicated copy of said data utilizing a remote access file system client local to said second node, and
   arbitrating access to said data utilizing a remote access file system server local to said first node in response to said receiving said access request.

4. The method of claim 3, wherein said providing further comprises:
   maintaining file system data at said second node utilizing said remote access file system.

5. The method of claim 3, wherein said receiving comprises:
   receiving said access request from an application local to said second node.

6. The method of claim 3, wherein
   said arbitrating said access to said data is performed at a file level.

7. The method of claim 3, wherein
   said establishing is performed utilizing said remote access file system server.

8. The method of claim 3, wherein said receiving comprises:
   receiving a read request for said replicated copy of said data.

9. The method of claim 3, wherein said receiving comprises:
receiving a write request for said replicated copy of said data.

10. The method of claim 9, wherein said providing further comprises:
performing a write operation on said data within said first volume utilizing said remote access file system, in response to receiving said write request for said replicated copy of said data, wherein
said replicating is performed in response to said performing said write operation.

11. A computer program product comprising:
a first set of instructions, executable on a computer system, configured to replicate data between a first volume and a second volume, wherein
said first set of instructions are executed in response to storage of said data, and
said first set of instructions comprise
a first sub-set of instructions, executable on said computer system, configured to create a replicated copy of said data,
said first set of instructions is configured to perform said replication bi-directionally between said first volume and said second volume,
said first volume is associated with a first node,
said second volume is associated with a second node, and
said first set of instructions is further configured to bi-directionally replicate said data between said first node and said second node;
a second set of instructions, executable on said computer system, configured to provide access to said replicated copy of said data, wherein
said access is provided to said replicated copy of said data in said second volume concurrently with said replicating,
said access is provided to said replicated copy of said data in said second volume utilizing a remote access file system,
said access is provided via a remote access file system client,
said remote access file system client is local to said second volume,
said second set of instructions comprises
a second sub-set of instructions, executable on said computer system, configured to arbitrate said access,
said second sub-set of instructions are configured to arbitrate said access by virtue of being configured to establish a resource lock for said data,
said second sub-set of instructions are configured to be executed by a remote access file system server, and
said remote access file system server is local to said first volume; and
a computer-readable storage medium, wherein said computer program product is encoded in said computer-readable storage medium.

12. The computer program product of claim 11, wherein said first set of instructions further comprises:
a second subset of instructions, executable on said computer system, configured to replicate said data from said first node to said second node.

13. The computer program product of claim 12, wherein said second set of instructions comprises:
a first subset of instructions, executable on said computer system, configured to receive an access request for said replicated copy of said data utilizing a remote access file system client local to said second node; and
a second subset of instructions, executable on said computer system, configured to arbitrate access to said data utilizing a remote access file system server local to said first node, wherein said second subset of instructions are executed in response to receipt of said access request.

14. The computer program product of claim 13, wherein said first subset of instructions said second set of instructions comprises:
a first subsubset of instructions, executable on said computer system, configured to receive said access request from an application local to said second node.

15. The computer program product of claim 13, wherein said second subset of instructions said second set of instructions comprises:
said second sub-set of instructions are further configured to arbitrate said access to said data at a file level.

16. The computer program product of claim 13, wherein said first subset of instructions said second set of instructions comprises:
a first subsubset of instructions, executable on said computer system, configured to receive a read request for said replicated copy of said data; and
a second subsubset of instructions, executable on said computer system, configured to receive a write request for said replicated copy of said data.

17. The computer program product of claim 16, wherein said first subset of instructions said second set of instructions further comprises:
a first subsubset of instructions, executable on said computer system, configured to perform a write operation on said data within said first volume utilizing said remote access file system in response to receiving said write request for said replicated copy of said data; and
a second subsubset of instructions, executable on said computer system, configured to replicate said data from said first volume to said second volume in response to said performing.

18. An apparatus comprising:
means for replicating data between a first volume and a second volume, wherein
said means for replicating is responsive to storage of said data, and
said means for replicating is configured to create a replicated copy of said data;
said means for replicating is configured to replicate said data bi-directionally between said first volume and said second volume,
said first volume is associated with a first node,
said second volume is associated with a second node, and
said means for replicating facilitates
bi-directionally replicating said data between said first node and said second node; and
a remote access file system, wherein
said remote access file system is configured to provide access to said replicated copy of said data,
said remote access file system comprises
a remote access file system client, and
a remote access file system server,
said remote access file system server is local to said first volume, and
said remote access file system client is local to said second volume; and
means for providing access to said replicated copy of said data in said second volume, wherein said means for providing said access is configured to provide said access concurrently with replicating said data,
said means for providing said access is further configured to provide said access utilizing said remote access file system,
said access is provided via said remote access file system client,
said remote access file system server comprises means for arbitrating said access, and
said means for arbitrating said access comprises means for establishing a resource lock for said replicated copy of said data.

19. The apparatus of claim 18, wherein
said means for replicating further comprises
  means for replicating said data from said first node to said second node,
said means for providing comprises
  means for receiving an access request, wherein
    said access request is a request for said replicated copy of said data,
    said means for receiving is configured to utilize a remote access file system client,
    said remote access file system client is local to said second node,
    said means for arbitrating said access is configured to utilize a remote access file system server, and
    said remote access file system server is local to said first node, and
said means for arbitrating access is responsive to receipt of said access request.

* * * * *